(12) United States Patent
Ieda

(10) Patent No.: US 8,302,135 B2
(45) Date of Patent: Oct. 30, 2012

(54) DIGITAL BROADCAST RECEIVER

(75) Inventor: Kazuhiro Ieda, Hirakata (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 1115 days.

(21) Appl. No.: 12/067,745

(22) PCT Filed: Sep. 21, 2006

(86) PCT No.: PCT/JP2006/318785
§ 371 (c)(1),
(2), (4) Date: Mar. 21, 2008

(87) PCT Pub. No.: WO2007/034899
PCT Pub. Date: Mar. 29, 2007

(65) Prior Publication Data
US 2009/0262253 A1   Oct. 22, 2009

(30) Foreign Application Priority Data

Sep. 21, 2005   (JP) ................................. 2005-274748
Sep. 20, 2006   (JP) ................................. 2006-255105

(51) Int. Cl.
*H04N 5/445* (2011.01)
*H04N 7/18* (2006.01)
*H04N 7/16* (2011.01)

(52) U.S. Cl. ................ 725/75; 725/35; 725/38; 725/85; 725/139; 725/151

(58) Field of Classification Search .................... 725/34, 725/35, 38, 45, 46, 75, 85, 139, 151
See application file for complete search history.

(56) References Cited

U.S. PATENT DOCUMENTS

| | | | |
|---|---|---|---|
| 5,371,550 A | 12/1994 | Shibutani et al. | |
| 6,266,519 B1 | 7/2001 | Eguchi et al. | |
| 7,375,771 B2 | 5/2008 | Naoi et al. | |
| 7,639,310 B2 * | 12/2009 | Kang | ............... 348/731 |
| 2004/0105031 A1 | 6/2004 | Shibusawa | |
| 2004/0244048 A1 * | 12/2004 | Wada et al. | ................... 725/120 |
| 2005/0034174 A1 | 2/2005 | Hatanaka | |

FOREIGN PATENT DOCUMENTS

| | | |
|---|---|---|
| JP | 11-298298 A | 10/1999 |
| JP | 3075101 U | 2/2001 |
| JP | 2001-285737 A | 10/2001 |

(Continued)

OTHER PUBLICATIONS

International Search Report of PCT/JP2006/318785, date of mailing Dec. 5, 2006.

(Continued)

*Primary Examiner* — Kieu Oanh T Bui
(74) *Attorney, Agent, or Firm* — Westerman, Hattori, Daniels & Adrian, LLP

(57) ABSTRACT

[Object] To provide a digital broadcast receiver capable of performing a channel scan in a relatively short time.
[Means for Solution] The digital broadcast receiver is designed for installation in an automobile for example, and identifies a current location using a GPS function. The receiver has a channel list per region containing physical channel information of broadcast stations which potentially exist in each region, and performs a channel scan based on broadcast data obtained from receiving means for physical channels listed on the channel list in a region identified.

14 Claims, 12 Drawing Sheets

FOREIGN PATENT DOCUMENTS

| | | |
|---|---|---|
| JP | 2003-174376 A | 6/2003 |
| JP | 2004-186975 A | 7/2004 |
| JP | 2004-266627 A | 9/2004 |
| JP | 2004-312164 A | 11/2004 |
| JP | 2004-320397 A | 11/2004 |
| JP | 2005-79861 A | 3/2005 |

OTHER PUBLICATIONS

Notification of Transmittal of Translation of the International Preliminary Report on Patentability (Form PCT/IB/338) of International Application No. PCT/JP2006/318785 mailed Sep. 18, 2008 with Forms PCT/IB/373 and PCT/ISA/237.

Supplementary European Search Report dated Oct. 12, 2010, issued in corresponding European Patent Application No. 06798224.9.

Japanese Office Action dated Aug. 23, 2011, issued in corresponding Japanese Patent Application No. 2007-536563.

European Office Action dated Oct. 25, 2011, issued in corresponding European Patent Application No. 06798224.9.

* cited by examiner

FIG.5

| ID | Region | Wide Area | ID | Region | Wide Area | ID | Region | Wide Area |
|---|---|---|---|---|---|---|---|---|
| 0 | Undefined | — | 22 | Aomori | — | 44 | Nara | 2 |
| 1 | Kanto wide area | — | 23 | Tokyo | 1 | 45 | Shiga | 2 |
| 2 | Kinki wide area | — | 24 | Kanagawa | 1 | 46 | Hiroshima | — |
| 3 | Chukyo wide area | — | 25 | Gunma | 1 | 47 | Okayama | 5 |
| 4 | Hokkaido area | — | 26 | Ibaragi | 1 | 48 | Shimane | 6 |
| 5 | Okayama-Kagawa area | — | 27 | Chiba | 1 | 49 | Tottori | 6 |
| 6 | Shimane-Tottori area | — | 28 | Tochigi | 1 | 50 | Yamaguchi | — |
| 7 | Undefined | — | 29 | Saitama | 1 | 51 | Ehime | — |
| 8 | Undefined | — | 30 | Nagano | — | 52 | Kagawa | 5 |
| 9 | Undefined | — | 31 | Niigata | — | 53 | Tokushima | — |
| 10 | Hokkaido (Sapporo) | 4 | 32 | Yamanashi | — | 54 | Kochi | — |
| 11 | Hokkaido (Hakodate) | 4 | 33 | Aichi | 3 | 55 | Fukuoka | — |
| 12 | Hokkaido (Asahikawa) | 4 | 34 | Ishikawa | — | 56 | Kumamoto | — |
| 13 | Hokkaido (Obihiro) | 4 | 35 | Shizuoka | — | 57 | Nagasaki | — |
| 14 | Hokkaido (Kushiro) | 4 | 36 | Fukui | — | 58 | Kagoshima | — |
| 15 | Hokkaido (Kitami) | 4 | 37 | Toyama | — | 59 | Miyazaki | — |
| 16 | Hokkaido (Muroran) | 4 | 38 | Mie | 3 | 60 | Oita | — |
| 17 | Miyagi | — | 39 | Gifu | 3 | 61 | Saga | — |
| 18 | Akita | — | 40 | Osaka | 2 | 62 | Okinawa | — |
| 19 | Yamagata | — | 41 | Kyoto | 2 | 63 | Undefined | — |
| 20 | Iwate | — | 42 | Hyogo | 2 | | | |
| 21 | Fukushima | — | 43 | Wakayama | 2 | | | |

FIG.6

A concept of WK Scanned-Physical-Channel management list

| Physical CH | 13 | 14 | ... | 62 |
|---|---|---|---|---|
| Scan completion flag | 0 | 0 | ... | 0 |

FIG.7

| Receiver location | Area Name | Area ID | TS_ID | TS Name | Parent station physical CH | Last Tuning Physical CH | Frequency Information | Scan success flag |
|---|---|---|---|---|---|---|---|---|
| 23 | Tokyo | 1 | 7FE0 | NHK, Tokyo | 27 | | 27, 27, 40 | |
| | | 1 | 7FE1 | NHK Education, Tokyo | 26 | | | |
| | | 1 | 7FE2 | Nippon Television | 25 | | | |
| | | 1 | 7FE3 | TBS | 22 | | | |
| | | 1 | 7FE4 | Fuji Television | 21 | | | |
| | | 1 | 7FE5 | TV Asahi | 24 | | | |
| | | 1 | 7FE6 | TV Tokyo | 23 | | | |
| | | 23 | 7E87 | Tokyo MX TV | 20 | | | |
| | | 1 | 7FE8 | Open University | 28 | | | |
| | | 24 | 7E77 | tvk | 18 | | | |
| | | 27 | 7E47 | Chiba Television | 30 | | | |
| | | 29 | 7E27 | Television Saitama | 32 | | | |

FIG.8

| Broadcast Service Area | Parent Station | | | Relay station | | |
|---|---|---|---|---|---|---|
| | Transmitting Station Location | Frequency (Channel Number) | Antenna Power (KW) | Transmitting Station Location | Frequency (Channel Number) | Antenna Power (KW) |
| Kanto wide area | Tokyo | 27 | 10 | (Tochigi) Utsunomiya Nikko Ohtawara | 47 47 47 | 0.1 0.01 0.01 |
| | | | | (Gunma) Maebashi Numata | 37 37 | 0.1 0.005 |
| | | | | (Saitama) Chichibu | 13 | 0.01 |
| | | | | (Chiba) Choshi Katsuura Togane | 34 34 34 | 0.01 0.01 0.01 |
| | | | | (Tokyo) Tama Niijima Hachijo | 27 27 40 | 0.02 0.03 0.01 |
| | | | | (Kanagawa) Hiratsuka Odawara | 19 19 | 0.1 0.01 |

DIGITAL BROADCAST RECEIVER

FIELD OF THE INVENTION

The present invention relates to terrestrial digital broadcast receivers, and more specifically to a digital broadcast receiver capable of performing a channel scan in the receiver at a high speed.

BACKGROUND ART

In Japan, terrestrial television broadcasting using digital signals was started in part of the country at the end of the year 2003, and is planned to be expanded to cover the entire country in the year 2006.

The terrestrial digital broadcasting will use UHF (Ultra-High Frequency) band, which includes physical channels from channel 13 to channel 62. Therefore, there is going to be a drastic increase in the number of channels as compared to VHF (Very High Frequency) band which is used in the current standard analog broadcasting.

In the current television broadcasting, broadcasting channels are fixed for each area, and television receivers are so made that when a user buys a new television receiver, he/she can input an area identification code such as a Postal Code which is specific to the location of installation (the area where the user lives). Through such an arrangement, channels available in the area can be set to channel selection positions. For this purpose, the television receivers store, in advance, a lookup table which relates available channels in each of the areas to channel selection positions, for the entire area of Japan.

Like the terrestrial analog-signal broadcasting, the terrestrial digital broadcasting will be made by a plurality of broadcast stations located in different regions. For this reason, selecting the place of installation (the area where the user lives) and setting channels available in the area to channel selection positions are also operations which need to be performed in the terrestrial digital receiver.

In the terrestrial digital broadcasting receivers, it is possible to identify the broadcasting company (broadcast station), etc. on the receiving channel, based on information added in a multiplex broadcast signal.

There is proposed an apparatus which is capable of making the setting on the place of living where the receiver is installed based on actual broadcast signals received, and is capable of making assignment to numeric keys on a remote controller based on the setting on the area where the user lives.

[Patent Document 1] JP-A 2005-79861 Gazette

DISCLOSURE OF THE INVENTION

Problems to be Solved by the Invention

However, there is no fixed location of broadcast receiving in mobile terrestrial digital broadcast receivers equipped in automobiles or incorporated in cellular phones. Even if the initial setting is made, the broadcast receiving area will change frequently because of their mobile nature. The change in the broadcast receiving areas poses problems: For example, a broadcast which was available before the change becomes unavailable after the change. A possible solution in such a case is to perform a channel scan and perform settings on available channels and channel selection positions automatically or manually based on user's operation. In the channel scan, all of the physical channels from channel 13 to channel 62 will be sequentially scanned for. Scanning for all of the channels poses a problem that it takes a long time.

In consideration of the above-described circumstances, the present invention provides a digital broadcast receiver which is capable of scanning channels within a relatively short time.

Means for Solving the Problems

A digital broadcast receiver according to the present invention is for receiving of terrestrial digital broadcast from broadcast stations whose availability depends on regions. The digital broadcast receiver includes: receiving means for receiving of a plurality of broadcasts by means of a tuner which receives terrestrial digital broadcasts; current region identification means for obtaining information which indicates a current region; a channel list which provides physical channel information of broadcast stations potentially existing per region; and channel scan means for making a channel scan for physical channels registered on a regional channel list obtained by the current region identification means, based on broadcast data obtained from the receiving means.

According to the above described arrangement, when performing a channel scan in a given region, the scanning is performed based on information about a fewer number of physical channels than a number of physical channels in which broadcast stations can potentially exist. Therefore, it becomes possible to perform the channel scan within a relatively short time.

The channel list may be a list of broadcast stations which are anticipated to be available per region.

Preferably, the digital broadcast receiver may further include channel scan complete flag setting means which sets a flag for a channel which has been scanned for in the channel scan.

With the above, preferably, the channel whose scan completion flag is set is skipped in the channel scan.

Preferably, the digital broadcast receiver further includes scan success flag setting means which sets a flag for a channel which has been successfully scanned for in the channel scan.

With the above, preferably, the channel whose scan success flag is set is skipped in the channel scan.

Preferably, the digital broadcast receiver further includes communication means which sends current region information obtained by the current region identification means to a communication counterpart and receives physical channel information about broadcast stations in the current region from the communication counterpart, for creation of the channel list.

Technical Advantage of the Invention

The present invention provides an advantage that a channel scan can be performed within a relatively short time.

DESCRIPTION OF THE PREFERRED EMBODIMENT

Embodiments of the present invention will be described in detail, with reference to the drawings. It should be noted here that the same or equivalent elements in the drawings will be indicated by the same reference symbols, and description for them will not be repeated to avoid repetition in the description.

FIG. 1 is a circuit configuration diagram of a terrestrial digital broadcast receiver according to a first embodiment of the present invention. FIG. 2 is a front view of the terrestrial digital broadcast receiver according to the present invention.

The present embodiment is a terrestrial digital broadcast receiver for installation in automobiles.

As shown in FIG. 2, a receiver 2 has a front face which includes a display screen provided by a liquid crystal display (LCD) panel 202 and an operation unit 214 provided by various buttons 214a, 214b, 214c disposed below the screen. On top of the receiver 2, an antenna 240 is attached rotatably. This receiver is for receiving of single-segment (one-segment) broadcast of terrestrial digital broadcasting. The receiver may be designed for 12-segment receiving as necessary.

The receiver 2 houses therein, circuits, etc. which are required for receiving terrestrial digital broadcast.

Referring to FIG. 1, the receiver 2 according to the present embodiment displays images on the liquid crystal display panel 202 and outputs sounds from a speaker 203, using encoded image/audio data obtained by a terrestrial digital tuner 220 through receiving of broadcast programs or using encoded image/audio data read from a memory card 3, etc. inserted into a slot 201.

The terrestrial broadcast receiver 2 includes an antenna terminal 206 for receiving signals captured by an UHF antenna 240. The antenna (ANT) terminal 206 is connected with a terrestrial digital tuner 220, where a signal of a predetermined channel is selected from broadcast signals which are provided to the antenna terminal 206, converted into digital broadcast data, and outputted. The channel selection operation in the terrestrial digital tuner 220 is performed on the basis of a channel selection signal provided from a tuner control I/F 239 of a digital broadcast receiving system integrated-circuit 20.

The digital broadcast receiving system integrated-circuit 20 is provided by a system LSI for example, which is a single chip formed with a functioning system that performs program receiving procedure in terrestrial digital broadcasting. The digital broadcast receiving system integrated-circuit 20 includes a CPU (Central Processing Unit) 231 for controlling the system, a TS separation unit 232, an image decoder unit 233, an audio decoder unit 234, a tuner control I/F 239, etc.

The broadcast receiving system integrated-circuit 20 is controlled by a microcomputer (hereinafter called main microcomputer) 200 which controls overall operation of the apparatus 2.

The channel selection signal provided from the main microcomputer 200 is provided to the digital broadcast receiving system integrated-circuit 20 via the I/O 238. The CPU 231 controls the tuner control I/F 239 according to the channel selection signal, and provides the channel selection signal to the terrestrial digital tuner 220.

The terrestrial digital tuner 220 selects signals of a specified frequency from a band of high frequency digital modulated signals which include image and audio data. Further, the terrestrial digital tuner 220 according to the present embodiment includes circuits which perform such processes as demodulation, error correction, etc., thus demodulates the selected digital modulated signals, and outputs a transport stream (TS) signal. The demodulation, error correction, etc. are performed by e.g. an ISDB-T (Integrated Services Digital Broadcasting-Terrestrial: terrestrial digital broadcasting) decoder, and then outputted as a TS signal. The demodulation is based on OFDM (Orthogonal Frequency Division Multiplexing).

The main microcomputer 200 is connected with an operation unit 214 which includes a plurality of operation buttons operable by the user, cursor keys (directional keys), channel selection buttons, etc., and a remote controller 216 serving as operation keys. Information entered through keying operations performed to the operation unit 214 is sent to the main microcomputer via an analog-digital conversion circuit (ADC) 215. As the user operates the operation unit or the remote controller 216, the main microcomputer 200 generates a channel selection signal, and sends the signal via the digital broadcast receiving system circuit 20 to the terrestrial digital tuner 220. In a case where the operation keys (remote controller) 216 use an infrared communication system, for example, for sending and receiving the data, the receiver 2 is provided with an infrared receiving unit.

It should be noted here that all or part of the operation unit 214 may be implemented by a touch panel provided in the liquid crystal display panel 202.

The main microcomputer 200 controls operations and functions of the entire receiver 2 according to operations performed on the operation unit 214 and the operation keys (remote controller) 216. Further, the main microcomputer 200 is connected with a nonvolatile memory 218 which stores programs for controlling the operations of the receiver apparatus, and a RAM 219 which is used as a temporary storage of data, a work memory, etc. The nonvolatile memory 218 may be provided by a flash memory, a hard disc, etc., whereas the RAM 219 may be provided by a SDRAM, etc. In addition, the nonvolatile memory 218 stores, as will be described later, broadcast program information (EPG), a regional broadcast station list, a scanned-physical-channel management list, etc. The broadcast program information (EPG), the regional broadcast station list, the scanned-physical-channel management list, etc. need not be stored in the flash memory but may be stored in a RAM or a memory card.

The digital broadcast receiving system integrated-circuit 20 is connected with a nonvolatile memory 221, and with a RAM 222 which is used as a temporary storage of data, a work memory, etc. In the present embodiment, the nonvolatile memory 221 is provided by a flash memory whereas the RAM 222 is provided by a SDRAM, etc. The nonvolatile memory 221 stores programs for controlling operations of the digital broadcast receiving system integrated-circuit.

As for the regional station list, a factory default list may be stored as permanent information for example, and updated information may be stored separately. The factory default regional station list which is stored permanently can be utilized when the receiver 2 is reset. As another option for information management, contents information and link information for making access thereto may be stored separately.

The transport stream (TS) signal from the tuner 220 is inputted to the digital broadcast receiving system integrated-circuit 20 via a TS-I/F circuit 235. The TS signal provided from the TS-I/F circuit 235 is then provided to a TS separation unit 232 incorporated therein.

The TS separation unit 232 separates image data and audio data which constitute a multiplex broadcast program, as well as separating NIT (Network Information Table), etc. which are included as added information in the multiplex transmission.

The image data separated in the TS separation unit 232 is provided to the image decoder 233. In the present embodiment, the encoded image data is H.264 data. The image decoder 233 decodes H.264 encoded image data and outputs an uncompressed digital image signal. The uncompressed digital image signal is outputted from a video (Video) output unit 236a. If the encoded image data is MPEG (Moving Picture Experts Group) data, the image decoder 233 performs MPEG decoding operation and outputs an uncompressed digital image signal.

The uncompressed digital image signal outputted from the video output unit 236a is provided to the video encoder 204. The video encoder 204 encodes the signal into a format that matches a format used in the liquid crystal display panel 202, and sends the signal to a graphic controller 205.

The graphic controller 205 performs color adjustment to the image data (R, G, B data for example) from the video encoder 204. Further, the graphic controller 205 superimposes the output from the video encoder 204 with e.g. OSD (On Screen Display) information of GUI format provided from the main microcomputer 200, and then outputs the signal to the liquid crystal display panel 202. The main microcomputer 200 provides textual information, etc. for operation buttons, electronic programming screens, menu screen, and so on.

The audio data separated by the TS separation unit 232 undergoes ACC decoding process in the audio decoder 234, and then outputted as an uncompressed digital audio data from an audio I/F 236b.

The audio data outputted from the audio I/F 236b is converted from digital signal to analog signal by a DAC (Digital Analog Converter) 208, controlled to a predetermined sound volume by a volume control circuit 209, amplified by an amplifier 210, and then outputted from a speaker terminal 211. The audio signal outputted from the speaker terminal 211 is outputted from the speaker 203.

The added information such as NIT separated by the TS separation unit 232 is provided from the I/O 238 to the main microcomputer 200.

Each of the circuits described above are powered by an electric power source 260 provided by an onboard secondary battery, etc. of the automobile.

FIG. 3 is an illustration showing an example of actual key layout on the remote controller 216 used in the receiver 2 in FIG. 1. The remote controller 216 includes numeric keys 216a provided by a key 1 through key 12. The numeric keys 216a are used as channel selection keys for the terrestrial digital tuner 220 in the receiver 2, and also as input keys for entering numeric information.

When used for channel selection, the numeric keys 216a function as one-touch channel-selection keys each corresponding to a remote_control_key_id described in the NIT, and also function as direct channel-selection keys for channel-selection through direct inputting of a three-digit number assigned to each service.

Further, the remote controller 216 is provided with a channel selection mode key 216b, a power key 216c, a program table key 216d and a menu key 216e.

The channel selection mode key 216b is for e.g. switching from one-touch channel selection mode to direct channel selection mode and vice versa. The power key 216c is for turning on and off the receiver 10. The program table key 216d is for displaying a program table, i.e. so called EPG (Electronic Program Guide). The menu key 216e is for displaying a menu which allows settings on various functions of the receiver 2.

Further, the remote controller 216 is provided with cursor keys 216f, an Enter key 216g for registering a selection made by using the cursor keys 216f, and an up-down keys 216h for scrolling through channels.

Standards for terrestrial digital broadcasting in Japan are established by ARIB (Association of Radio Industries and Businesses). Among these, receiver functional specification is disclosed in Volume Two of ARIBTR-B14 "Provisions for Terrestrial Digital Television Broadcasting Operation: Technical Information". The added information is described as follows:

A Service_id is contained in the service list descriptor of the NIT (Network Information Table) and in the TS (Transport Stream) information descriptor included in the added information in the digital broadcast. The Service_id identifies the service area and the service provided therein.

FIG. 4 shows a data structure of the Service_id. As shown in FIG. 4, Service_id is a 16-bit string. The upper six bits constitute an area identification data 4a, and the next bit constitutes a Dual-TS flag 4b. The next two bits constitute a service category 4c, next four bits constitute an area broadcaster ID 4d, and the lower three bits constitute a service number 4e.

The area identification data 4a identifies the area by a number selected from 0 through 64. As shown in FIG. 5, the numbers 0 through 9 indicate wide area broadcast while the numbers 10 through 63 indicate local-area (prefectural station) broadcast. More specifically, as shown in FIG. 5, the wide area broadcast category includes Kanto, Kinki and Chukyo areas as well as Hokkaido, Okayama-Kagawa and Shimane-Tottori areas. The local-area broadcast category includes Hokkaido which is divided into a total of six areas. In addition, each prefecture represents an area. FIG. 8 shows Kanto wide area broadcast zone, a parent station, relay stations and their relationship.

The Dual-TS flag 4b shown in FIG. 4 can take a value of "0" which means that the signal is the first of one or two TS's in the area identified by the area identification data 4a. The value "1" means that the signal is the second of two TS's transmitted by the same broadcaster in the area identified by the area identification data 4a.

The service category 4c indicates the type of broadcast. The value "0" indicates a TV type service, the value "1" or "2" indicates data type service excluding partial receiving service, and the value "3" indicates data type service of partial receiving service.

The area broadcaster identifier 4d takes a number from 0 through 15, each corresponding to one of the broadcasters A through P.

Further, the service number 4e is a number from 0 through 7, which is a number the broadcaster can set for the service category 4c within the TS. In other words, this number is the so called channel number.

The terrestrial digital broadcasting will follow the current style of viewer interfacing used in analog broadcasting so that the viewers will not be confused at the time of transition. Specifically, because the digital broadcast services will be provided by the current analog broadcasting companies, an arrangement has been made so that the viewers can continue to use the current channel number system, i.e. the remote controller numeric keys in the digital receiver will have the same channel number allocation as in the current analog broadcast channel number allocation.

Here below, a common procedure for obtaining the service list will be described.

(1) First, the user makes a setting on the region where he/she lives.

(2) Upon a scan start command, a search is performed from channel 13 through channel 62 in the tuner of the receiver to obtain the service list.

(3) The remote_control_key_id's are included in the NIT, whereby one of the remote control key numbers 1 through 12 which is desired by the broadcast company is assigned to each of the TS. Through this process, a typical service provided through each TS is assigned to each remote control key.

(4) If the same TS is detected on a plurality of carriers, the system checks C/N (Carrier/Noise: a ratio between the carrier and noise) and BER (Bit Error Rate), to select a superior carrier.

Through the procedure described above, settings are made on the available channels and the channel selection positions. Now, in this channel scan, a long time must be spent if the scan is made, for example, for all of the physical channels, i.e. from channel 13 to channel 62. In the present embodiment, an arrangement is made so that the channel scan can be made within a relatively short time. In order to do this, the regional broadcast station list and the scanned-physical-channel management list are stored in the nonvolatile memory 218, and utilized in the channel scan.

Next, description will cover the regional broadcast station list and the scanned-physical-channel management list which are stored in the nonvolatile memory 218.

(A) Regional Broadcast Station List

The regional broadcast station list is a list of broadcast stations which are available (which should be available) in each area, and contains the following information for example:

(a) Receiver location: This is a number used to identify the area (The number is the same as the area identification number).

(b) TS_ID: This is a unique identifier given to each broadcast station. In the case of ISTB-T in Japan, the Minister of Public Management, Home Affairs, Post and Telecommunications assigns it to each of the broadcast stations. It should be noted here that information about the broadcast station is contained in the NIT which is included in the broadcast data, and once the NIT is received, it is possible to identify the name of the broadcast station which transmits the broadcast wave received.

(c) TS name: This is the name of the broadcast station. In the case of ISTB-T, this is contained the NIT which is included in the broadcast data.

(d) Parent station's physical channel: This is a physical channel of a parent station of the broadcast station. It is assumable that a parent station has the largest broadcast area. Physical channels of parent stations are published by the Ministry of Public Management, Home Affairs, Post and Telecommunications.

(e) Last Tuning physical channel: This is the physical channel in the last successful channel selection or scanning (An initial value for this may be the parent station's physical channel).

(f) Frequency information: In the case of MFN (Multi Frequency Network), all broadcast frequencies including those (physical channel numbers) of relay stations are contained for each broadcast station. In ISTB-T, the information is contained in the NIT. As factory default values, physical channels (frequencies) of the parent station and the relay stations published by the Ministry of Public Management, Home Affairs, Post and Telecommunications are used. It should be noted, however, that the information published by the Ministry of Public Management, Home Affairs, Post and Telecommunications only gives a complete list of broadcast stations for NHK, and NHK Education Channel. For other private broadcast stations, frequencies are not listed for each broadcast station but there is only a list of all private relay stations within the area. Therefore, all of the relay station frequencies in the region are contained in the default. The default information may be updated when an NIT is received, by overwriting the information with the latest frequency information obtained from the NIT. Under a factory default setting, scanning may take a long time because the scanning is made not only for target broadcast stations but also for other frequencies. From the second time, however, it is possible to hold only relay station frequencies of target broadcast stations, since the frequency information contained in the NIT is utilized.

(g) Area identification: This is the area of broadcast by the broadcast station. This information exists in the upper six bits in the Service ID in the receiving descriptor as part of the NIT.

(h) Scan success flag: This flag is set (ON) when a physical channel of a target broadcast station is detected successfully through scanning. Before performing the scan, the flag for the target broadcast station is reset (OFF). Determination on the success is made on the basis of the TS_ID in the NIT obtained through the scan, and a flag for the target broadcast station is set. As shown in FIG. 7, the flag is set in a flag field of the corresponding broadcast station in the memory. When set, the field has a value "1" while it has a value "0" when reset.

An example of regional broadcast station list for Tokyo area is shown in FIG. 7. It should be noted that FIG. 7 shows factory default settings, and so the information may be changed as NITs are obtained through a channel scan. It should be noted further that not all pieces of information listed in the figure is mandatory. For example, the TS name is not necessary if the TS_ID is given. Since the physical channel number is related to the frequency, only one of these may be on the list. Note, further, that FIG. 7 does not show description of private relay station channels (frequency information).

When making the regional broadcast station list, care should be taken on the following points: The receiver may be able to receive broadcast signals from stations in nearby prefectures depending on the place (location) where the receiver is. Therefore, if it is assumed that the receiver can take signals from those broadcast stations located outside of the region, those broadcast stations accessible by the receiver should be included in the list, in advance, in the relevant broadcast receiving area. For example, since "Chiba TV" can be available in part of Tokyo, factory default settings include "Chiba TV" in the broadcast receiving area for "Tokyo" (See FIG. 7). For broadcast stations outside of the region, factory default settings may include only parent station channels, so that the relay stations will be registered when a channel scan is made and an NIT is obtained.

(B) Scanned-physical-channel Management List

There are regions where different broadcast stations use the same physical channel, although their receiving areas do not overlap each other. When scanning is performed, a list is used for management of frequencies which have been tried. In the present embodiment, this list is called scanned-physical-channel management list. As shown in FIG. 6, the scanned-physical-channel management list relates each of physical channel numbers to a flag, and all of the flags are reset (OFF) before performing a channel scan process. Specifically, the scanned-physical-channel management list enables to prevent a situation where scanning is repeated for the same channel within a channel scan process.

Next, description will cover the channel scan process based on a flowchart in FIG. 9. The flowchart illustrates control operations provided mainly by the main microcomputer 200.

This channel scan process is performed automatically when receiving of a broadcast signal has become impossible due to ambulation, or when a scan operation command is issued by the user.

First, the main microcomputer 200 identifies the region where the receiver is (Step S1). The receiver location identification is made, for example, based on input made through the operation unit 214 or the operation keys 216. The operation unit 214 or the operation keys 216 include a button for the receiver location identification; otherwise, the keys are pressed in a specific combination in order to issue a command for making the receiver location identification process. Upon receiving of this command, the main microcomputer 200 starts the receiver location identification process. For example, when the main microcomputer 200 determines that a key for receiver location identification has been pressed, then the liquid crystal display panel 202 displays a list such as "Tokyo", "Chiba", "Saitama", etc. on its screen.

For example, the user determines and specifies the current location according to his/her knowledge. If a touch panel is provided, this location setting is made by touching on the display thereby selecting the current location on the display. Other usable arrangement may be such that a cursor is moved onto a position on the screen where the location is shown and then the Enter key, for example, is pressed to specify the location.

In this case, the nonvolatile memory 218 stores a region number lookup table which relates each of the regions to their number, e.g. "Tokyo"=23, "Chiba"=27, "Saitama"=29.

Next, the main microcomputer 200 reads the scanned-physical-channel management list from the nonvolatile memory 218 to make a list in the work memory provided by the RAM 219, and clears (resets) the flag fields (Step S2). Further, according to the specified location, the main microcomputer 200 reads, from the nonvolatile memory 218, information about this particular region contained in the regional broadcast station list in FIG. 7, and in order to make this data available in the following processes, stores the data in the RAM 219, and then resets the scan success flag fields (Step S3).

Next, broadcast stations registered in the regional broadcast station list for the area identified by the receiver location which is stored in the RAM 219 are read out sequentially for the purpose of scanning (Step S4). This regional broadcast station list is stored as illustrated in FIG. 7. Now assume that those listed in an upper portion in FIG. 7 have higher addresses and those in the lower portion having lower addresses. Then, the reading is made from the highest address toward the lowest address sequentially, for the purpose of scanning.

Then, the main microcomputer 200 determines on whether or not scanning has been performed for all of the broadcast stations which must be scanned for. If scanning has not been made for any of the target broadcast stations, the process goes to Step S6, whereas the process goes to Step S14 if scanning has been performed for all of the target broadcast stations. In Step S14, the scanning operation is stopped. The determination for this is made by checking the flags in the scanned-physical-channel management list stored in the RAM 219. In the first scan, the flag fields in the scanned-physical-channel management list are cleared (reset) in Step S2, so the process goes to Step S6. Then, the main microcomputer 200 searches the regional broadcast station list in the RAM 219, and determines if the target broadcast stations have their scan success flags set (ON) or not. The determination is made by checking the status of the flags in the scan success flag field for corresponding broadcast stations. If the flag has been set, there is no need for performing a scan again, so the process returns to Step S4.

In the first scan, the flag fields of the scan success flags are cleared (reset) in Step S3, so the process goes to Step S7.

Next, if there is a target broadcast station whose scan success flag has not been set (OFF), the tuner is targeted for the lastly tuned (Last Tuning) physical channel, the parent station's physical channel and frequency information (relay station channel), sequentially in this order, as a target physical channel for scanning to capture the broadcast station (Step S7). In Step S7, the physical channel which has been selected as a target physical channel is excluded from target physical channels for the next scanning so that scanning will not be made for it in the next loop process. Specifically, first, when a lastly tuned (Last Tuning) physical channel is selected as a target physical channel for scanning, this particular physical channel is excluded from the target physical channels so that it will not be a target of scanning in the next loop procedure. As a result of selecting the lastly tuned (Last Tuning) physical channel, settings which must be selected in Step S7 are the parent station's physical channel and frequency information (relay station channel). Once the parent station's physical channel is selected as a target physical channel for scanning in Step 7, then, this physical channel that has been selected as a target physical channel is excluded from target physical channels for the next scanning so that scanning will not be made in the next loop process. As a result of selecting a parent station's physical channel, a setting which must be selected in Step S7 is now frequency information (relay station channel). Once frequency information is selected in Step S7 as a target physical channel for scanning, this frequency information is excluded from target physical channels for the next scanning, so that scanning will not be made for this frequency information in the next loop process. Once all pieces of frequency information are set, there is no longer a target frequency for scanning, in Step S7.

Then, the system determines if this process has been completed for all of the channels, i.e. whether or not there is any more frequency which must be scanned for (Step S8). If there is no more frequency for which scanning must be made, the process returns to Step S4.

On the other hand, if there is a frequency for which scanning must be made, the process goes to Step S9, and checks the flag in the scanned-physical-channel management list to determine if the frequency (channel) selected in Step S7 has already been scanned for. If the process determines that the flag is set, i.e. that scanning has been done before, then the process returns to Step S7, to make settings for the next frequency.

In Step S7 in the first scan, the main microcomputer 200 gives the digital broadcast receiving system integrated-circuit 20 the frequency of lastly tuned (Last Tuning) physical channel as the physical channel for which scanning is to be made. In Step S8, the process finds that there is a frequency to be scanned for, and thus proceeds to Step S9. In the first scan, Step S2 clears (resets) the flag fields in the scanned-physical-channel management list, and the process thus proceeds to Step S11.

If Step S9 determines that scanning has not been performed, the scan completion flag in the scanned-physical-channel management list is set (ON), and the tuner control unit 239 in the digital broadcast receiving system integrated-circuit 20 sets the frequency selected in Step S7 to the terrestrial digital tuner 220, and then broadcast data is obtained and analyzed (Step S10). A time out limit is set on the time allowed for obtaining the broadcast data. If the broadcast data has not been obtained within this time limit, the process goes to the next step. This scanning timeout time may be set to three seconds, for example.

Then, the main microcomputer 200 determines if an NIT has been successfully obtained from the analyzed broadcast data (Step S11). If it has not, the process goes back to Step S7.

If an NIT has been obtained, the main microcomputer 200 sets (ON) the scan success flag, based on this TS_ID, for the broadcast station of the TS_ID in the "regional broadcast station list" (Step S12).

Then, based on the TS_ID in the obtained NIT, the system determines if the broadcast wave which was captured is of the target broadcast station for which scanning was made. If it is of the target broadcast station, the process skips the rest even if there are other target physical channels (parent station's physical channel and frequency information) within the broadcast station (In other words, the process goes back to Step S4). On the other hand, if there is no target broadcast station, the process goes back to Step S7.

In the above-described loop process, all broadcast stations within the broadcast receiving area have their scan success flags set (ON). Specifically, if the main microcomputer 200 determines YES in Step S5, this means that scanning was successfully completed for all of the broadcast stations available in the given broadcast receiving area, and thus the scanning process is brought to an end (Step S14). The scanning process is also brought to an end when there is no more channel which must be scanned for. Specifically, even if all of the broadcast stations on the list have not their scan success flag set (ON), it is assumed that scanning for these was not successful by chance, due to blockage by a building, high-speed ambulation, etc., and in this case too, the scanning process is brought to an end.

Once the scanning process is complete, the regional broadcast station list in the nonvolatile memory 218 is updated based on the newly overwritten regional broadcast station list in the RAM 219. The updated list is stored as the latest regional broadcast station list.

Hereinafter, description will be made for a case where a channel scan is made for the first time in Tokyo area. The regional broadcast station list for Tokyo area is in default status. First, the parent station channel, i.e. CH27, is selected (See FIG. 7). If an NIT is successfully obtained in CH27, and if "7FE0" is successfully obtained from the NIT, then a scan success flag for CH27 in the Tokyo region in the regional broadcast station list is set (ON). Then, the flag for CH27 in the scanned-physical-channel management list is set (ON) also, and the next channel, i.e. CH26, is selected (Steps S4→S5→S6→S7→S8→S9→S10→S11→S12→S13→S4). Note that frequency information may be updated based on the obtained NIT. Note also, that the lastly tuned physical channel is CH27 now. In the next channel scan in Tokyo region, it is possible to use the lastly tuned physical channel instead of the parent station channel.

Continuing with the above-described premise, if it is not possible to obtain an NIT in CH27, the process tries to select CH27 in the frequency information criterion (See FIG. 7 and FIG. 8); however, CH27 has already been scanned for. In the scanned-physical-channel management list, a flag is already set (ON) for CH27. Therefore, CH40 is searched for in the frequency information criterion, and if an NIT is not obtainable, the process goes for selecting the next channel, i.e. CH26.

Continuing with the same premise, assume further, that an NIT was not obtainable in CH27, and that CH21 is found in the frequency information. Then assume that CH21 was selected and "7FE4" was obtained. 7FE4 is a private station TS_ID, which means that the channel scan for that broadcast station was successful. Hence, if frequency information is successfully obtained from an NIT of this private station CH21, then frequency information for this particular CH21 will be updated. Thereafter, the next channel, i.e. CH26 is selected. Thus, selection of parent station channels continues in the order of CH26→CH25→CH22→CH21, but since the channel CH21 has already done, it is skipped in Step S9. Note that if the next channel scan failed to get CH21, it is still possible to perform scanning by using frequency information which was obtained from the NIT of the previously captured CH21.

As has been described, the channel scan process according to the present embodiment is not such that scanning is made for all of the physical channels (in which a broadcast station can potentially be found) in numerical order. As a result, the time necessary for the channel scan can be shorter.

It should be noted here that the scanned-physical-channel management list may not necessarily be used. In this case, multiple scanning is unavoidable, yet the time necessary for the channel scan is still shorter than a case where scanning is made for all of the physical channels. Further, in case where scanning for a station was not successful by chance due to blockage by a building for example, the above multiple scanning will provide additional opportunities for successful scanning.

It should be appreciated that although a factory default list is used at first, the contents in the list is overwritten as NIT's are obtained, whereby the contents in the list is always maintained as the latest. If the receiver is brought out of Tokyo area, and then brought back from outside into Tokyo area, a channel scan is performed based on this latest contents on the list.

In the above embodiment, a channel list is provided by the regional broadcast station list which contains, in advance, information on physical channels of the broadcast stations that should be available in each of the regions; however, the present invention is not limited to this. The channel list may be created based on physical channel numbers entered by the user. For example, there may be an arrangement that the user enters physical channel numbers of the broadcast stations he/she remembers, to the receiver 2 for creation of the list. In this case, the arrangement may be such that entering all of the channels CH13 through CH63 is not allowed, but a selected number, e.g. 10 channels are allowed for input.

Next, a second embodiment of the present invention will be described with reference to FIG. 10. The second embodiment is a version of the first embodiment provided with a car navigation function, and has the same configuration as the embodiment shown in FIG. 1, except for the added function of car navigation. Hereinafter, in order to avoid repetition, description will only cover the added function. Components which are identical with those in the first embodiment will be indicated by the same reference symbols, and description for these will not be repeated again.

FIG. 10 is a circuit configuration diagram showing a terrestrial digital broadcast receiver according to the second embodiment of the present invention. As shown in FIG. 10, a navigation unit 5 is connected with a receiver 2 in the second embodiment.

Each of these navigation unit 5 and the receiver 2 is connected with a liquid crystal display panel 221, an operation unit 214, operation keys 216 and a speaker 203, as well as with each other via connection I/O units 238, 502.

The navigation unit 5 according to the present embodiment includes a navigation integrated-circuit 50 which is provided with a CPU 501. The navigation integrated-circuit 50 is connected with a nonvolatile memory 52 which stores programs for operating this apparatus, and with a RAM 51 which is used as temporary storage of data, a work memory, etc. The nonvolatile memory 52 may be provided by a flash memory, a hard disc, etc., while the RAM 51 may be provided by an SDRAM. The navigation integrated-circuit 50 performs detection and determination operations on a current position, using programs stored in the nonvolatile memory 52.

In the present embodiment, detection of the current position is performed on the basis of navigation data obtained from a GPS (Global Positioning System) receiving unit 53. The GPS receiving unit 53 receives satellite signals from a GPS antenna 55 via an antenna terminal 54, and detects the current position.

Also, the navigation integrated circuit 50 determines, by using the CPU 501, an area which the detected current position falls on, and sends the result of determination from the I/O 502 to the receiver 2 as area information.

If navigation information is outputted as audio messages, the navigation integrated-circuit 50 creates corresponding audio data, and the audio data is outputted from an audio I/F 503. The audio data outputted from the audio I/F 503 is then converted from digital signal to analog signal by a DAC 505, controlled by a volume control circuit 209 to a predetermined sound volume, amplified by an amplifier 210, and then outputted from a speaker terminal 211. The audio signals outputted from the speaker terminal 211 is outputted from the speaker 203.

Now, in the second embodiment, area information detected by the navigation unit 5 is used for receiver location identification. Namely, in Step S1 in the flowchart in FIG. 9, identification of the receiver location is achieved by using area information obtained from the navigation unit 5. As described above, a current position is detected on the basis of navigation data obtained from the GPS (Global Positioning System) receiving unit 53. Then, the CPU 501 determines which area the detected current position falls on, and sends the result of determination from the I/O 502 to the receiver 2 as area information. Based on the obtained area information, the main microcomputer 200 identifies the receiver location. Then, the above-described Steps S3 through S14 are executed to perform the channel scan process.

Next, a third embodiment of the present invention will be described with reference to FIG. 11. The third embodiment is a version of the second embodiment further provided with communication means. The embodiment in FIG. 10 includes a communication SD card 3b instead of the memory card 3, but otherwise the two embodiments are identical with each other. Hereinafter, in order to avoid repetition, description will only cover the added function. Components which are identical with those in the first and the second embodiments will be indicated by the same reference symbols, and description for these will not be repeated again.

In the third embodiment, the communication SD card 3b is inserted into a slot 201 for a communication capability via wireless LAN. The communication SD card 3b provides communication means for sending information on the current receiver location which has been obtained by the GPS, etc. to a communication counterpart (such as a site on the Internet), and receiving information from the communication counterpart, on physical channels of broadcast stations in the current receiver location so that the above-described channel list can be created.

Next, a fourth embodiment of the present invention will be described with reference to FIG. 12. The fourth embodiment is a digital broadcast receiver in the form of a mobile telephone terminal which incorporates a terrestrial digital broadcast receiver. The fourth embodiment includes a digital broadcast receiving unit which is essentially the same as in the embodiment shown in FIG. 1. Hereinafter, in order to avoid repetition, identical components will be indicated by the same reference symbols, and description for these will not be repeated again.

FIG. 12 is a circuit configuration diagram of a terrestrial digital broadcast receiver according to the fourth embodiment of the present invention.

The mobile telephone includes a main unit 6 which is provided with an antenna 61 and a baseband integrated-circuit 6 that performs modulation/demodulation, baseband processing, codec processing, etc. for the mobile telephone. The baseband integrated-circuit 6 includes a CPU 600, a buss I/F 602, an audio I/F 601, etc.

Data from the baseband integrated-circuit 60 is provided to the CPU 231, etc. via the buss I/F 602 and the host I/F 238b of the digital integrated-circuit 20.

The antenna 61 allows transmission and receiving of radio waves to and from a mobile telephone base station. The antenna 61 is connected with an antenna terminal 62. Received signals are provided to the baseband integrated-circuit 60 via an RF circuit 63. Data to be transmitted is made so from the baseband integrated-circuit 60, via the RF circuit 63, the antenna terminal 62, and then from the antenna 61 to the mobile telephone base station.

The baseband integrated-circuit 60 is connected with a nonvolatile memory 65 which stores programs for controlling operation of the baseband integrated-circuit 60, and with a RAM 64 which is used as temporary storage of data, a work memory, etc. The nonvolatile memory 64 may be provided by a flash memory, etc., while the RAM 65 may be provided by an SDRAM.

The baseband integrated-circuit 60 is provided with digital audio data which originally comes from a microphone 68 in the form of audio data and is converted into digital form by an analog-digital conversion circuit (ADC) 69. This audio data undergoes codec processing, baseband processing and modulation processing, and then transmitted.

Received audio data undergoes a predetermined processing in the baseband integrated-circuit 60, and then outputted from the audio I/F 601 as audio data. The audio data outputted from the audio IN 601 is converted from digital signal to analog signal in a DAC 66, controlled by a volume control circuit 209 to a predetermined sound volume, amplified by an amplifier 210, and then outputted from a speaker terminal 211. The audio signal outputted from the speaker terminal 211 is outputted from a speaker 203.

The mobile telephone includes operation keys 70 which have ten keys, etc. Dialing and other operation can be made by using these operation keys.

The mobile telephone is capable of obtaining variety of information such as image contents, audio contents and position information via the mobile telephone connection through communication with the digital broadcast receiver.

The fourth embodiment differs from the first embodiment as follows: In the first embodiment, the main microcomputer 200 controls operation of the receiver 2 whereas in the fourth embodiment, a CPU 231 in a digital broadcast receiving system integrated-circuit 20 controls broadcast receiving operation including those for the channel scan process.

In the fourth embodiment, the digital broadcast receiving system integrated-circuit 20 is connected with a nonvolatile memory 221 which stores programs for controlling operation of the apparatus, and with a RAM 222 which is used as temporary storage of data, a work memory, etc. The nonvolatile memory 221 may be provided by a flash memory, etc., while the RAM 222 may be provided by an SDRAM. Further, as described earlier, the nonvolatile memory 221 stores broadcast program information (EPG), a regional broadcast station list, a scanned-physical-channel management list, etc.

The operations are performed according to the flowchart in FIG. 9, with some differences from the first embodiment in terms of the operations provided by the main microcomputer 200 and the operations provided by the CPU 231. Hereinafter, the operations according to the fourth embodiment will be described with reference to FIG. 9.

Now, a channel scan process will be described based on the flowchart in FIG. 9. For the present embodiment, description will be made with a focus on controlling operations provided by the CPU 231.

This channel scan process is performed automatically when receiving of broadcast signals becomes impossible due to ambulation, or when a scanning operation command is issued by the user.

First, the CPU 231 identifies the receiver location (Step S1). The receiver location identification is made by using position information obtained from the mobile telephone 6 and under commands issued through the use of the operation keys 70. Upon receiving of a command for the identification, the CPU 231 starts the receiver location identification process. For example, when the CPU 231 detects that a key for receiver location identification has been pressed, then the liquid crystal display panel 202 displays a list such as "Tokyo", "Chiba", "Saitama", etc. on its screen.

Next, the CPU 231 reads the scanned-physical-channel management list from the nonvolatile memory 221, and makes the list in the work memory provided by the RAM 222, and clears (resets) the flag fields (Step S2). Further, according to the specified location, the CPU 231 reads, from the nonvolatile memory 221, information about for this particular region contained in the regional broadcast station list in FIG. 7, and in order to make this data available in the following processes, stores the data in the RAM 222, and then resets the scan success flag fields (Step S3).

Next, broadcast stations registered in the regional broadcast station list for the area identified by the receiver location which is stored in the RAM 222 are read out sequentially for the purpose of scanning (Step S4).

Then, the CPU 231 determines on whether or not scanning has been performed for all of the broadcast stations which must be scanned for. If scanning has not been made for any of the target broadcast stations, the process goes to Step S6, whereas the process goes to Step S14 if scanning has been performed for all of the target broadcast stations. In Step S14 the scanning operation is stopped. The determination for this is made by checking the flags in the scanned-physical-channel management list. In the first scan, the flag fields in the scanned-physical-channel management list are cleared (reset) in Step S2, so the process goes to Step S6. Then, the CPU 231 determines if the target broadcast stations have their scan success flags set (ON) or not. The determination is made by checking the status of the flags in the scan success flag field for corresponding broadcast stations. If the flag has been set, there is no need for performing a scan again, so the process returns to Step S4.

In the first scan, the flag fields of the scan success flags are cleared (reset) in Step S3, so the process goes to Step S7.

Next, if there is a target broadcast station whose scan success flag has not been set (OFF), the tuner is targeted for the lastly tuned (Last Tuning) physical channel, the parent station's physical channel and frequency information (relay station channel), sequentially in this order, as a target physical channel for scanning to capture the broadcast station (Step S7). In Step S7, the physical channel which has been selected as a target physical channel is excluded from target physical channels for the next scanning so that scanning will not be made for it in the next loop process. Specifically, first, when a lastly tuned (Last Tuning) physical channel is selected as a target physical channel for scanning, this particular physical channel is excluded from the target physical channels so that it will not be a target of scanning in the next loop procedure. As a result of selecting the lastly tuned (Last Tuning) physical channel, settings which must be selected in Step S7 are the parent station's physical channel and frequency information (relay station channel). Once the parent station's physical channel is selected as a target physical channel for scanning in Step S7, then, this physical channel that has been selected as a target physical channel is excluded from target physical channels for the next scanning so that the scanning will not be made in the next loop process. As a result of selecting a parent station's physical channel, a setting which must be selected in Step S7 is now frequency information (relay station channel). Once frequency information is selected in Step S7 as a target physical channel for scanning, this frequency information is excluded from target physical channels for the next scanning, so that scanning will not be made for this frequency information in the next loop process. Once all pieces of frequency information are set, there is no longer a target frequency for scanning, in Step S7.

Then, the system determines if this process has been completed for all of the channels, i.e. whether or not there is any more frequency which must be scanned for (Step S8). If there is no more frequency for which scanning must be made, the process returns to Step S4.

On the other hand, if there is a frequency for which scanning must be made, the process goes to Step S9, and checks the flag in the scanned-physical-channel management list to determine if the frequency (channel) selected in Step S7 has already been scanned for. If the process determines that the flag is set, then the process returns to Step S7, to make settings for the next frequency.

In the first scan, the CPU 231 gives, in Step S7, a digital broadcast receiving system integrated-circuit 20 the frequency of lastly tuned (Last Tuning) physical channel as the physical channel which must be scanned for. In Step S8, the process finds that there is a frequency to be scanned for, and thus proceeds to Step S9. In the first scan, Step S2 clears (resets) the flag fields in the scanned-physical-channel management list, and the process thus proceeds to Step S11.

If Step S9 determines that scanning has not been performed, the scan completion flag in the scanned-physical-channel management list is set (ON), and the tuner control unit 239 in the digital broadcast receiving system integrated-circuit 20 sets the frequency selected in Step S7 to the terrestrial digital tuner 220, and then broadcast data is obtained and analyzed (Step S10). A time out limit is set on the time allowed for obtaining the broadcast data. If the broadcast data has not been obtained within this time limit, the process goes to the next step. This scanning timeout time may be set to three seconds, for example.

Then, the CPU 231 determines if an NIT has been successfully obtained from the analyzed broadcast data (Step S11). If it has not, the process goes back to Step S7.

If an NIT has been obtained, the CPU 231 sets (ON) the scan success flag, based on this TS_ID, for the broadcast station of the TS_ID in the "regional broadcast station list" (Step S12).

Then, based on the TS_ID in the obtained NIT, the system determines if the broadcast wave which was captured is of the target broadcast station for which scanning was made. If it is of the target broadcast station, the process skips the rest even if there are other target physical channels (parent station's physical channel and frequency information) within the broadcast station (In other words, the process goes back to Step S4). On the other hand, if there is no target broadcast station, the process goes back to Step S7.

In the above-described loop process, all broadcast stations within the broadcast receiving area have their scan success flags set (ON). Specifically, if the CPU 231 determines YES in Step S5, this means that scanning was successfully completed for all of the broadcast stations available in the given broadcast receiving area, and thus the scanning process is brought to an end (Step S14). The scanning process is also brought to an end when there is no more channel which must be scanned for. Specifically, even if all of the broadcast stations on the list have not their scan success flag set (ON), it is assumed that scanning for these was not successful by chance, due to blockage by a building, high-speed ambulation, etc., and in this case, too, the scanning process is brought to an end.

Once the scanning process is complete, the regional broadcast station list in the nonvolatile memory 221 updated based on the newly overwritten regional broadcast station list in the RAM 222. The updated list is stored as the latest regional broadcast station list.

As described above, there is provided a digital broadcast receiver incorporated in a mobile telephone terminal, including a terrestrial digital broadcast receiver and capable of performing the channel scan at a high speed.

Since the fourth embodiment includes communication means which is provided by a mobile telephone, there may an arrangement that information on the current receiver location is sent to a communication counterpart (such as a site on the Internet) to receive information on physical channel of broadcast stations in the current receiver location from the communication counterpart so that the above-described channel list can be created.

Next, a fifth embodiment of the present invention will be described with reference to FIG. 13. The fifth embodiment is a digital broadcast receiver incorporated in a mobile telephone terminal, including a terrestrial digital broadcast receiver. Whereas the fourth embodiment has a digital broadcast receiving unit and a mobile telephone integrated circuit formed on separate chips, the fifth embodiment includes these on a single chip. Specifically, a digital broadcast receiving system integrated-circuit 20 includes a baseband processing circuit. Other aspects of the configuration are essentially the same as in the embodiment shown in FIG. 12. Hereinafter, in order to avoid repetition, identical components will be indicated by the same reference symbols, and description for these will not be repeated again.

Since ISDB-T has a download capability through broadcast waves, this downloading capability via the broadcast waves may be utilized for creation/updating of the channel list.

Also, there may be an arrangement that an edit button, for example, is provided so that the receiver is brought into an edit mode when this button is pressed. The edit mode may provide such functions as: that physical channels on the channel list may be selected and deleted; and that the user is allowed to enter physical channel numbers he/she knows to add frequencies of broadcast stations. Selection of a specific physical channel can be achieved by moving the cursor onto the number for example.

In the above-described examples, if scanning was successful for a parent station's physical channel, then scanning is not performed for the relay stations' physical channels. If scanning was unsuccessful for the parent station's physical channel, then scanning for the relay stations' physical channels is performed. However, the present invention is not limited to this. For example, as described earlier with the case of Chiba TV in Tokyo region, an arrangement may be such that scanning for relay stations' physical channels is not performed for broadcast stations outside of the region even if the scanning for the parent station's physical channel has not been successful. This is because scanning attempt to find relay stations' physical channels for a broadcast station located outside of the region will take a long time yet there is only a low probability for successful scanning.

(All-Channel Scan)

There can be a case, for example, where scanning has not been successful for a broadcast station which is listed in the regional broadcast station list for that particular receiver location. In such a case, it is likely that the physical channel of the undetected broadcast station has been changed, and that it is possible to find the remaining undetected physical channels by performing an all-channel scan. As understood, the all-channel scan mode enables to find new broadcast stations and those broadcast stations which now have new frequency allocations. If the all-channel scan is to be performed, Step S14 in the flowchart in FIG. 4 which leads to an end of scanning operation is replaced by shifting to the all-channel scan mode, for example. In the all-channel scan mode, scanning should only be performed for those physical channels which are listed in the scanned-physical-channel management list and are not yet scanned for. The physical channels which are not tried yet on the scanned-physical-channel management list can be identified by a search for physical channels whose flag is not yet set (OFF). Then, scanning is made in the ascending order, for example, of the physical channel numbers of those physical channels which are listed in the scanned-physical-channel management list and are not yet scanned for.

Further, there may be an arrangement for the all-channel scan; that a scanning timeout time when scanning for a physical channel whose flag has not been set on the scanned-physical-channel management list is shorter (1.5 through 2 seconds for example) than the scanning timeout time (3 seconds for example) for the physical channels listed on the channel list (e.g. the regional broadcast station list). By shortening the scanning timeout time for the physical channels which are not listed on the channel list as described allows for a high-speed all-channel scan.

Further, the area identification may be performed by using whichever of a six-bit area identification (area_code) included in the service ID and a twelve-bit area identification (area_code) included in a terrestrial distribution descriptor. It should be noted, however, that the two codes, which indicate the same area, have different values from each other. For example, the area identification value for the Kanto wide area is "1" in the 6-bit information while it is "1445" in the 12-bit information. Whichever of these may be used as the area identification information, but it is advisable that only one of the two should be used so as to avoid confliction.

Aside from Japanese ISDB-T, there are other standards for terrestrial digital broadcasting, such as North American "ATSC" (Advanced Television Systems Committee) and European "DVB-T" (Digital Video Broadcasting Terrestrial). The present invention is also applicable to these standards.

Any of the embodiments disclosed herein should be understood as examples, and not be limiting in any aspects. It is intended that the scope of the invention is not be limited by this detailed description, but by the claims and the equivalents to the claims appended, including all modifications within the scope thereof.

INDUSTRIAL APPLICABILITY

A digital broadcast receiver according to the present invention can be suitably used for mobile equipment.

BRIEF DESCRIPTION OF THE DRAWINGS

FIG. 5 shows a wide-area broadcast stations lookup table for each region.

FIG. 6 shows an example of scanned-physical-channel management list.

FIG. 7 shows an example of regional broadcast station list for Tokyo region.

FIG. 8 shows physical channel information for Tokyo in Kanto wide-area.

LEGEND

Figure 1:
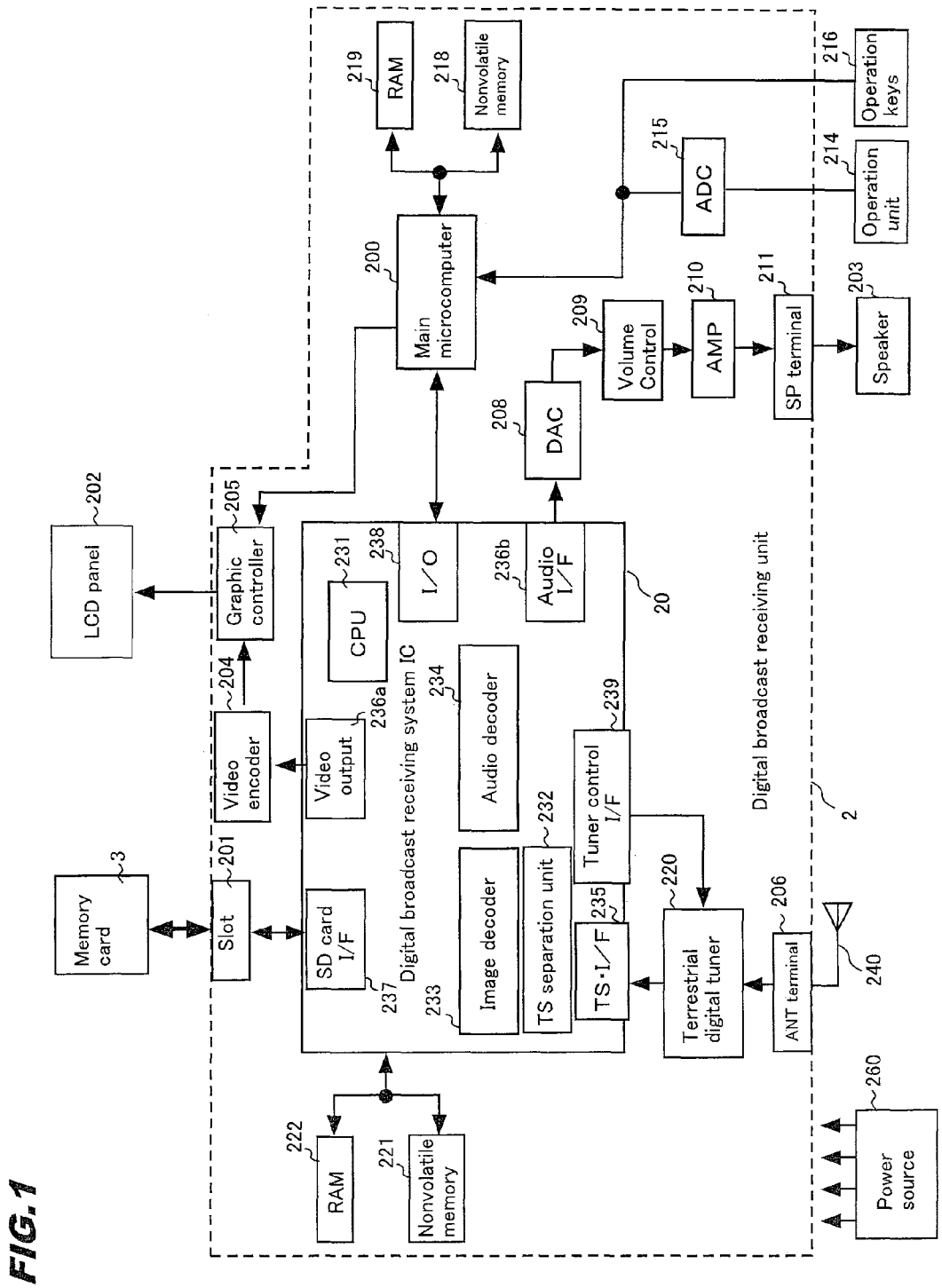
FIG. 1 is a circuit configuration diagram of a terrestrial digital broadcast receiver according to a first embodiment of the present invention.
Figure 2:
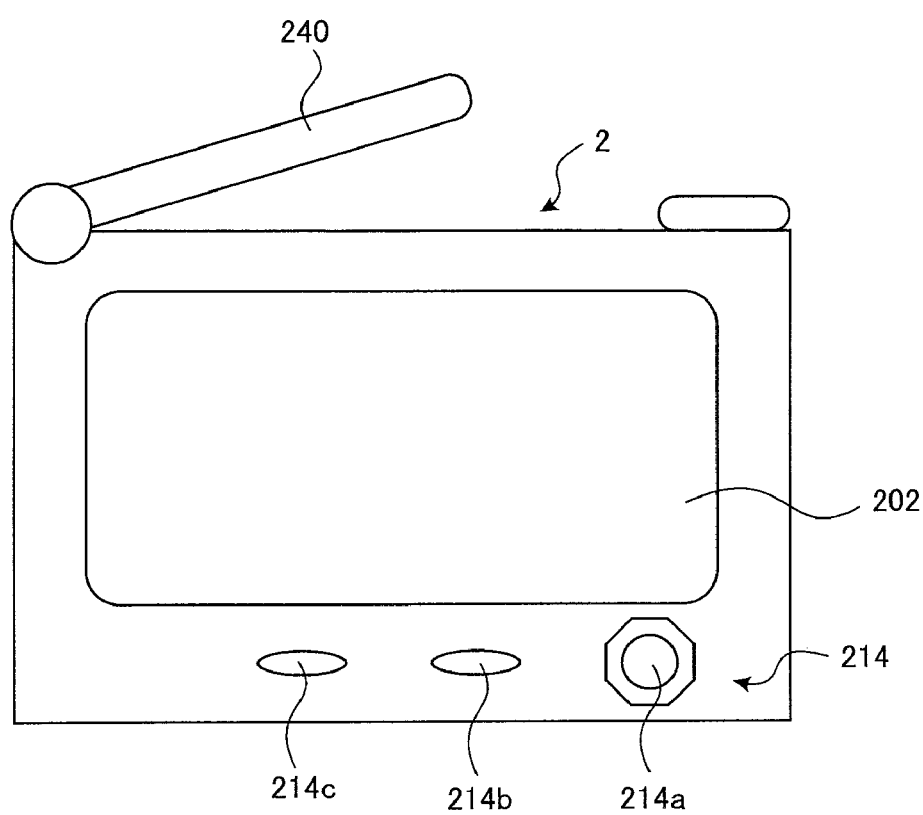
FIG. 2 is a front view of the terrestrial digital broadcast receiver according to the present invention.
Figure 3:
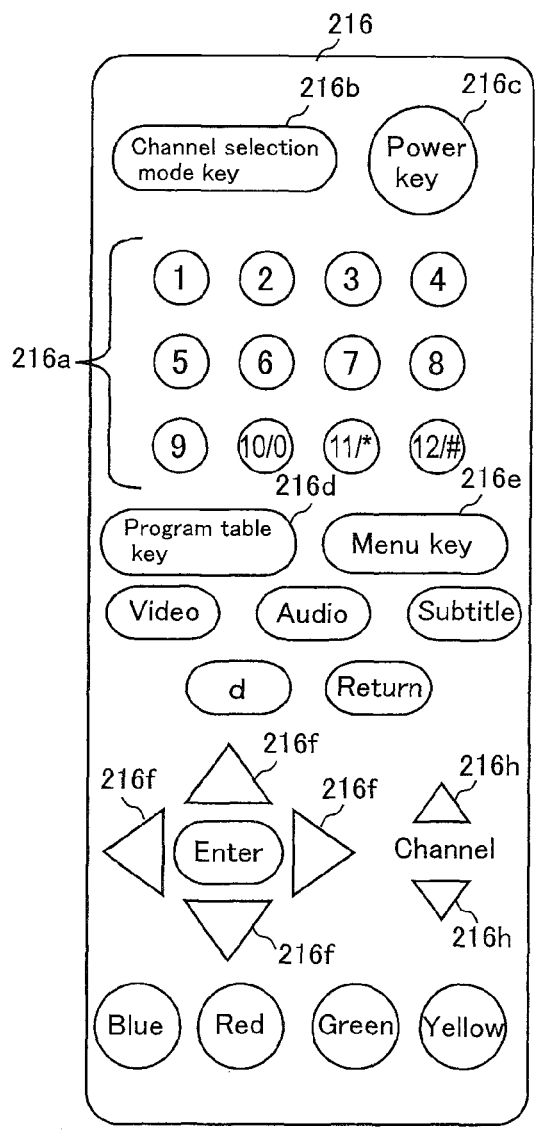
FIG. 3 is an illustration showing an example of actual key layout on a remote controller used in the terrestrial digital broadcast receiver according to the present invention.
Figure 4:
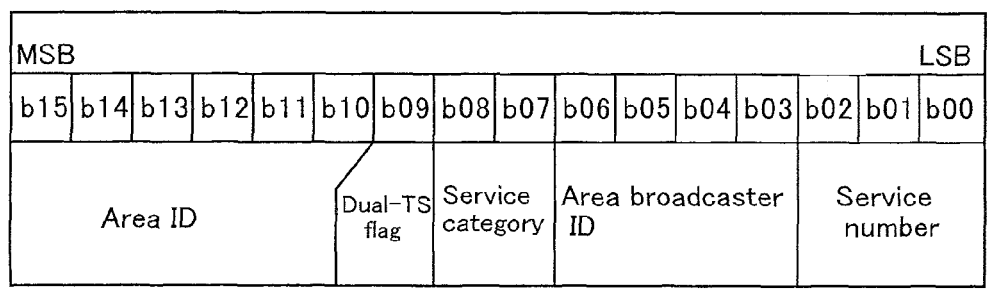
FIG. 4 shows a data structure of service ID information transmitted in terrestrial digital broadcasting.
Figure 9:
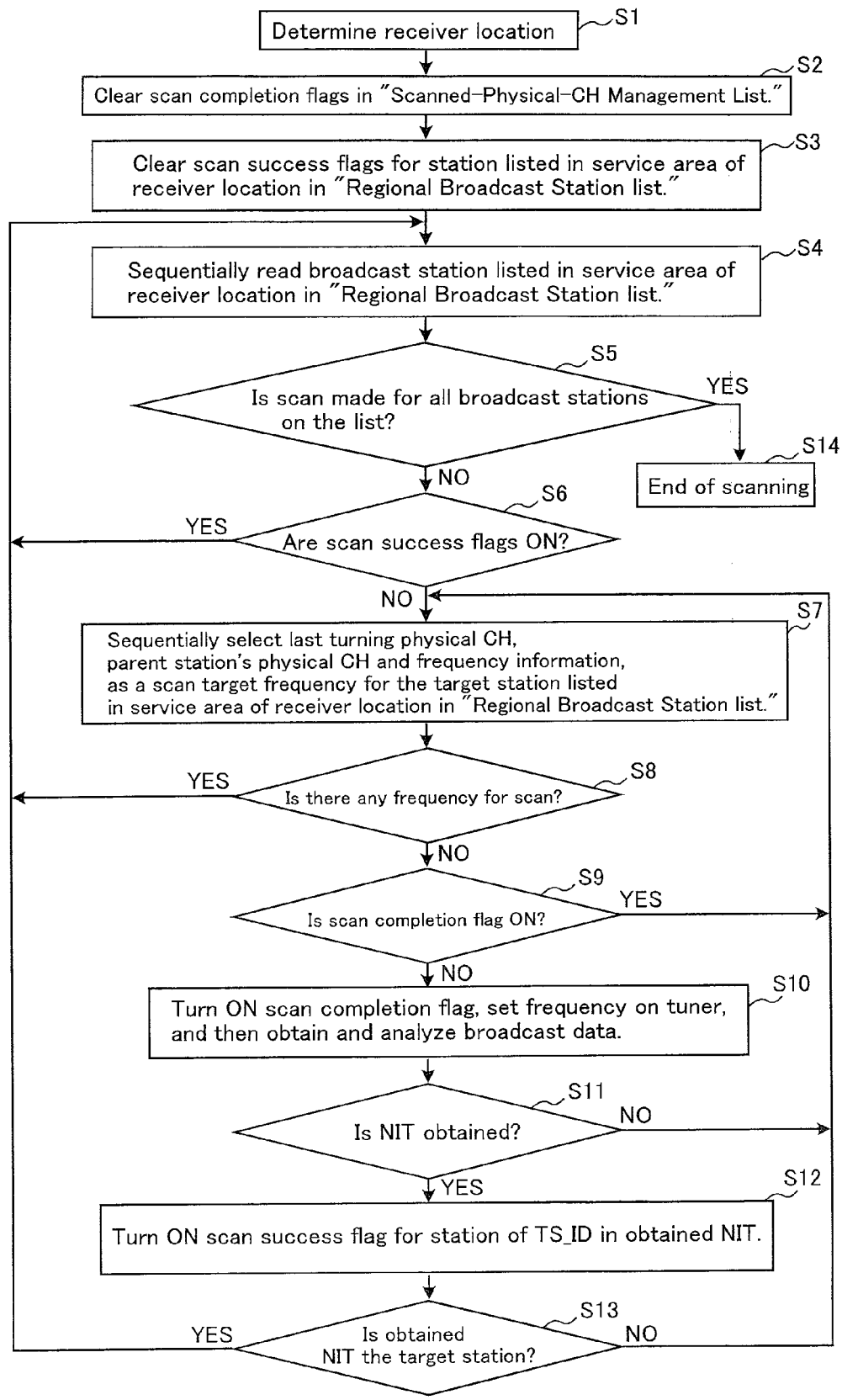
FIG. 9 is a flowchart which shows contents of processing according to the present invention.
Figure 10:
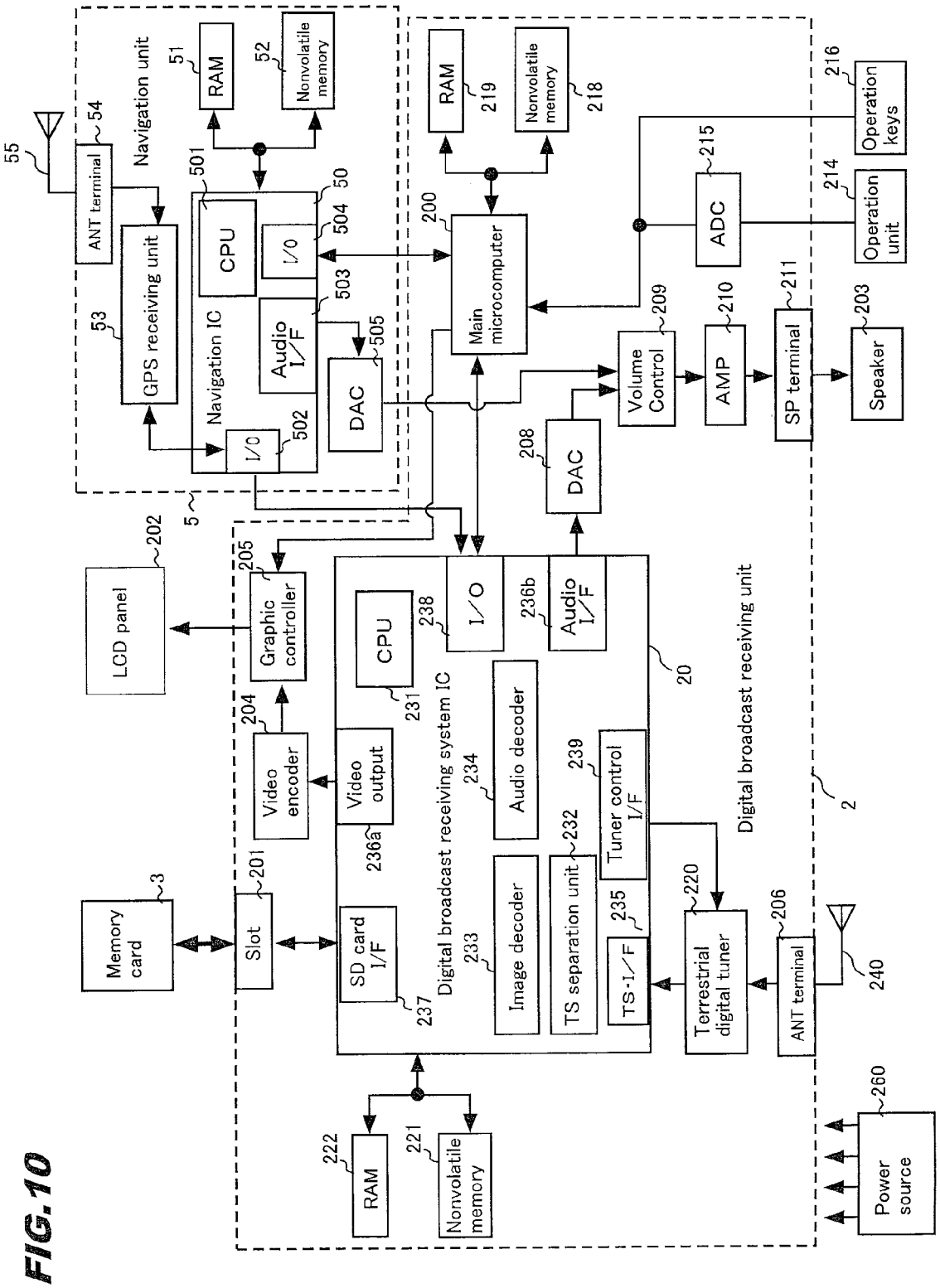
FIG. 10 is a circuit configuration diagram of a terrestrial digital broadcast receiver according to a second embodiment of the present invention.
Figure 11:
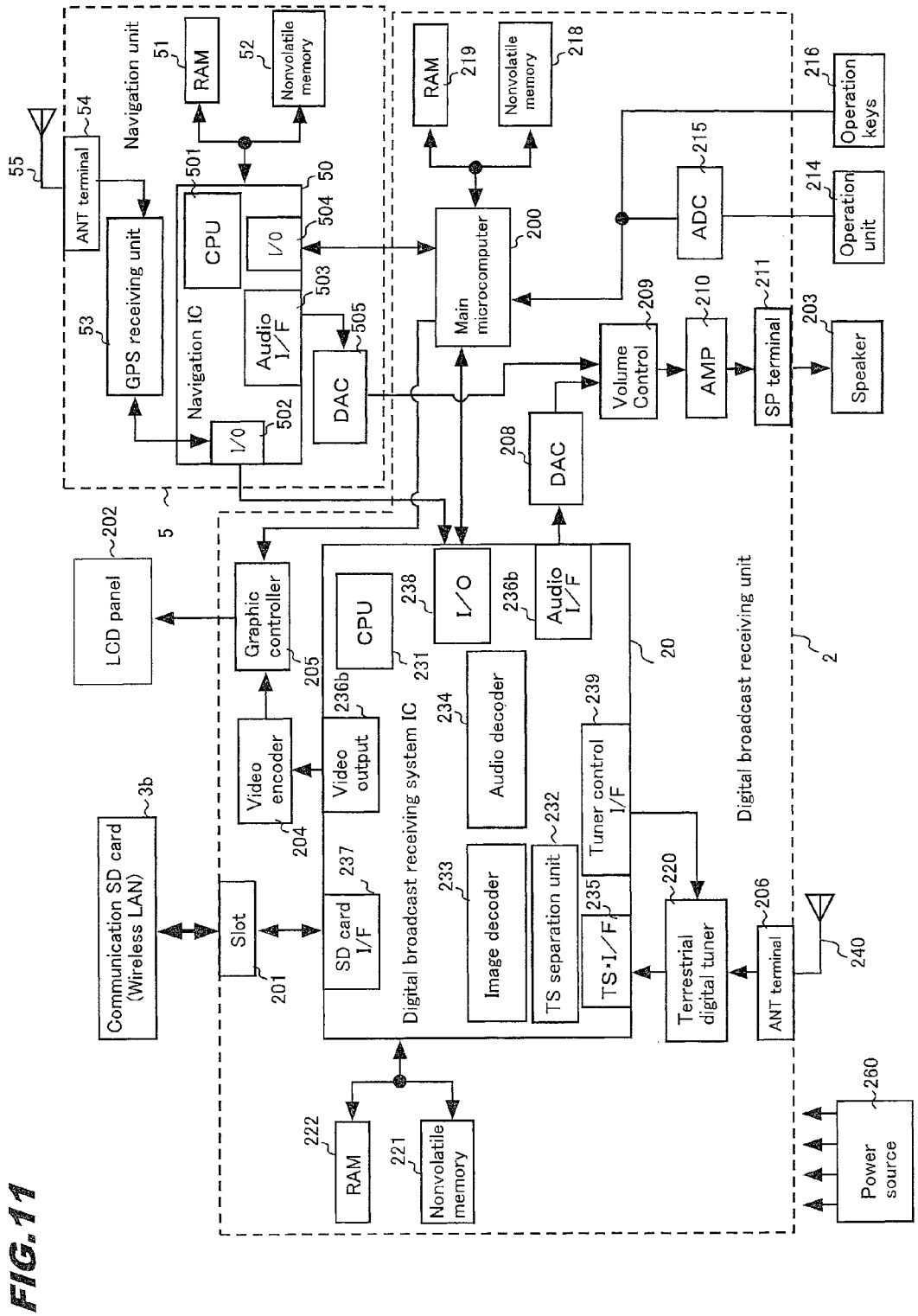
FIG. 11 is a circuit configuration diagram of a terrestrial digital broadcast receiver according to a third embodiment of the present invention.
Figure 12:
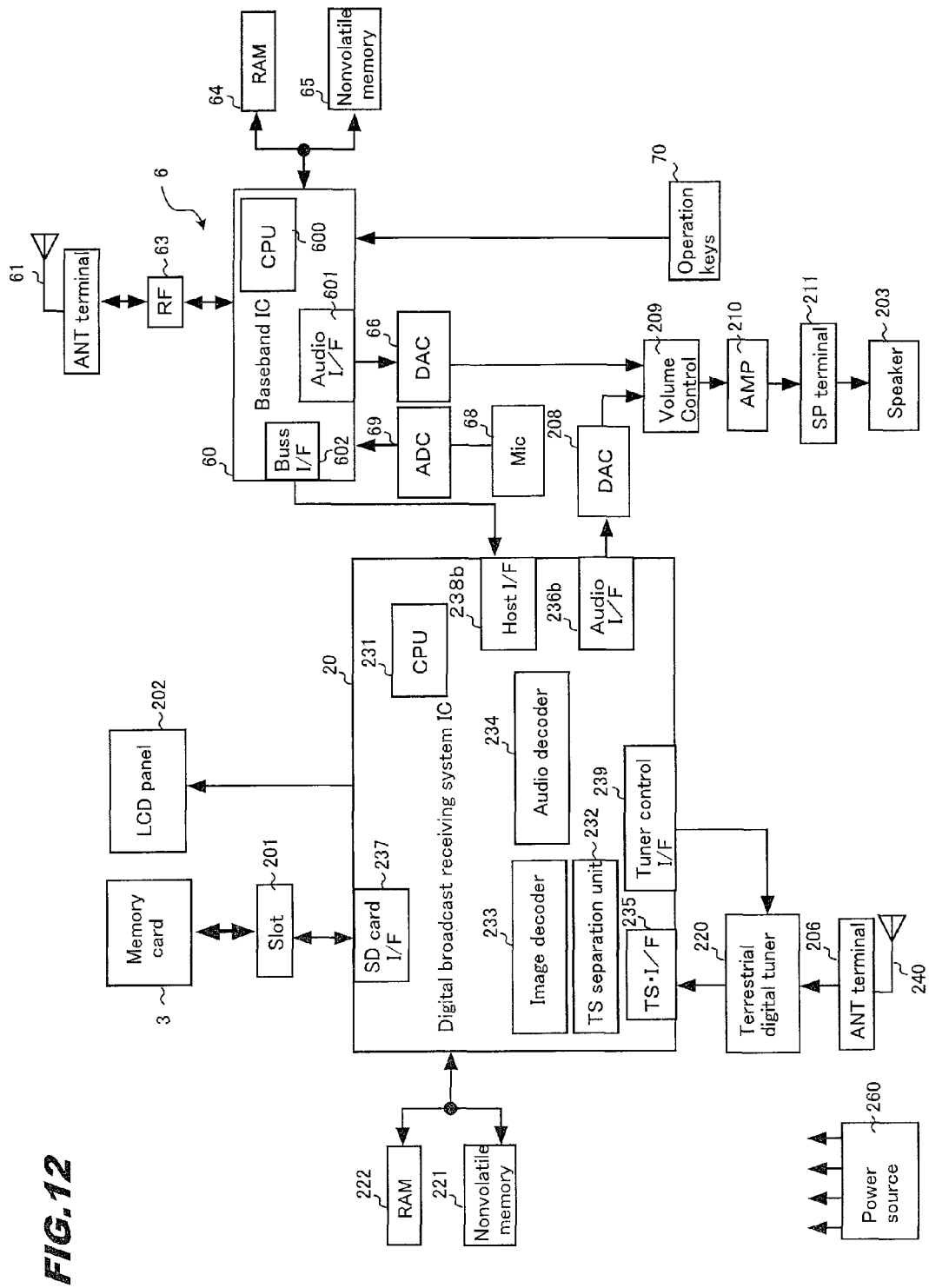
FIG. 12 is a circuit configuration diagram of a terrestrial digital broadcast receiver according to a fourth embodiment of the present invention.
Figure 13:
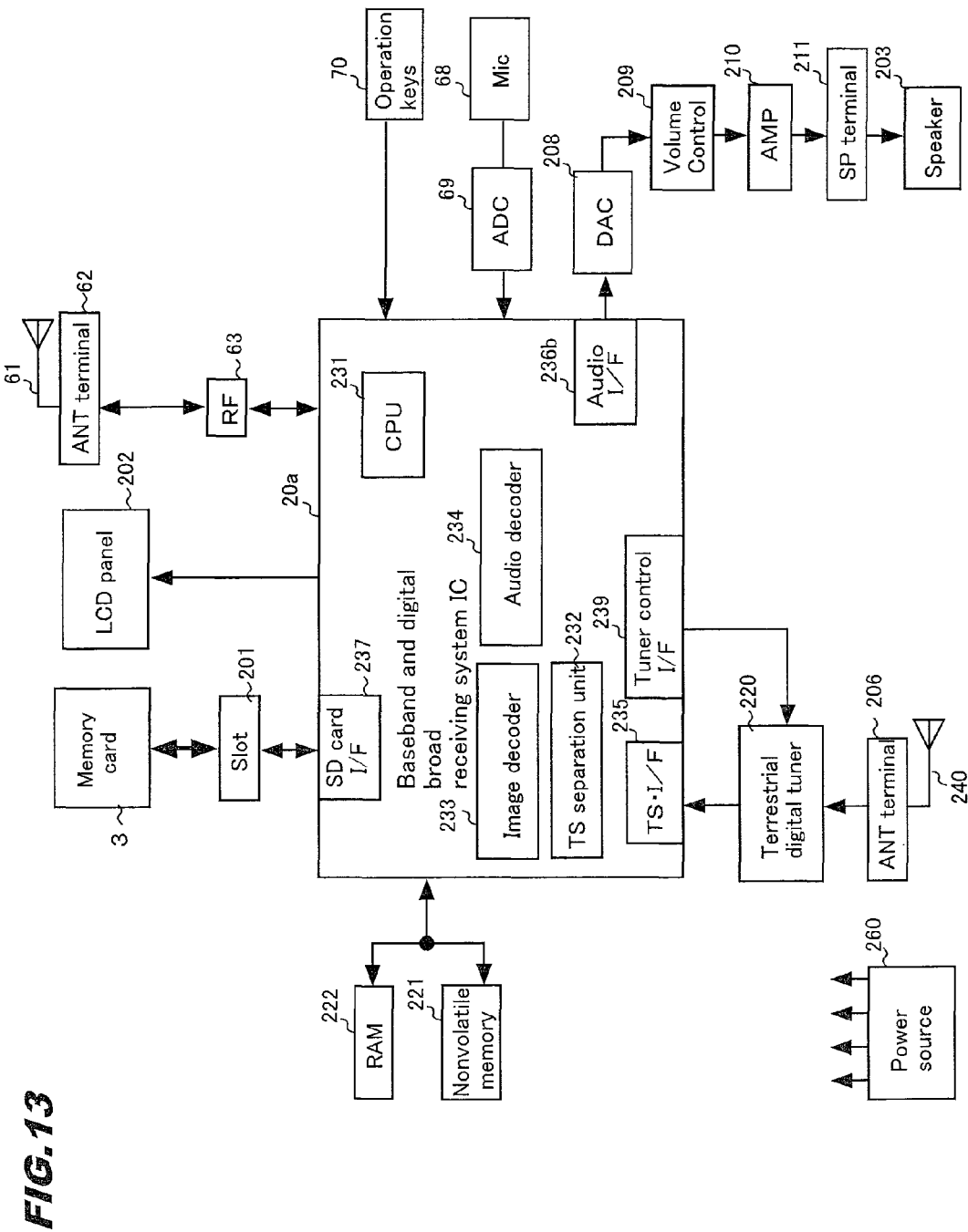
FIG. 13 is a circuit configuration diagram of a terrestrial digital broadcast receiver according to a fifth embodiment of the present invention.

2 Digital broadcast receiver
20 Digital broadcast receiving system integrated-circuit
200 Main microcomputer
202 Liquid crystal display panel
203 Speaker
220 Terrestrial digital tuner
221 Nonvolatile memory
222 RAM
231 CPU
232 TS separation unit
233 Image decoder
234 Audio decoder

The invention claimed is:

1. A digital broadcast receiver for receiving of terrestrial digital broadcast from broadcast stations whose availability depends on regions, the digital broadcast receiver comprising: receiving means for receiving of a plurality of broadcasts by means of a tuner which receives terrestrial digital broadcasts; current region identification means for obtaining information which indicates a current region; a channel list which provides physical channel information of broadcast stations potentially existing per region; and channel scan means for making a channel scan for physical channels registered on a regional channel list obtained by the current region identification means, based on broadcast data obtained from the receiving means.

2. The digital broadcast receiver according to claim 1, wherein the channel list is a list of broadcast stations which are anticipated to be available per region.

3. The digital broadcast receiver according to claim 1, further comprising channel scan complete flag setting means for setting a flag for a channel which has been scanned for in the channel scan.

4. The digital broadcast receiver according to claim 3, wherein the channel whose scan completion flag is set is skipped in the channel scan.

5. The digital broadcast receiver according to claim 1, further comprising scan success flag setting means for setting a flag for a channel which has been successfully scanned for in the channel scan.

6. The digital broadcast receiver according to claim 5, wherein the channel whose scan success flag is set is skipped in the channel scan.

7. The digital broadcast receiver according to claim 1, further comprising communication means for sending current region information obtained by the current region identification means to a communication counterpart and receiving physical channel information about broadcast stations in the current region from the communication counterpart, for creation of the channel list.

8. A digital broadcast receiver for receiving of terrestrial digital broadcast from broadcast stations whose availability depends on regions, the digital broadcast receiver comprising:
a tuner which receives terrestrial digital broadcasts; current region identification unit for obtaining information which indicates a current region; a memory for storing a channel list which provides physical channel information of broadcast stations potentially existing per region; and a control unit for making a scanning process for physical channels registered on a regional channel list obtained by the current region identification unit, based on broadcast data obtained from the tuner.

9. The digital broadcast receiver according to claim 8, wherein the channel list is a list of broadcast stations which are anticipated to be available per region.

10. The digital broadcast receiver according to claim 8, wherein a scanned-physical-channel management list is provided in the memory; a flag for a physical channel which has been scanned in the scanning process is set in the scanned-physical-channel management list; and the control unit sets the flag in the scanned-physical-channel management list in the physical channel which has been scanned.

11. The digital broadcast receiver according to claim 10, wherein the physical channel whose scan completion flag is set is skipped in the physical channel scanning process by the control unit.

12. The digital broadcast receiver according to claim 8, wherein a scan success flag field is stored in the memory; a flag for a channel which has been successfully scanned in the scan; and the control unit sets the scan success flag for physical channel which has been successfully scanned.

13. The digital broadcast receiver according to claim 12, wherein the physical channel whose flag of the scan success flag field is set is skipped in the physical channel scanning process by the control unit.

14. The digital broadcast receiver according to claim 8, further comprising communication unit for sending current region information obtained by the current region identification unit to a communication counterpart and receiving physical channel information about broadcast stations in the current region from the communication counterpart, for creation of the channel list.

* * * * *